(12) United States Patent
Zeitz et al.

(10) Patent No.: US 6,424,296 B1
(45) Date of Patent: Jul. 23, 2002

(54) INTEGRATED ADAPTIVE ANTENNA OF A MULTIBEAM ANTENNA

(75) Inventors: Rüdiger Zeitz, Leonberg; Harald Muller, Munchingen, both of (DE)

(73) Assignee: SEL Verteidigungsysteme GmbH, Stuttgart (DE)

( * ) Notice: Subject to any disclaimer, the term of this patent is extended or adjusted under 35 U.S.C. 154(b) by 0 days.

(21) Appl. No.: 09/736,025

(22) PCT Filed: Jun. 23, 1999

(86) PCT No.: PCT/IB99/01169

§ 371 (c)(1),
(2), (4) Date: Dec. 20, 2000

(87) PCT Pub. No.: WO99/67854

PCT Pub. Date: Dec. 29, 1999

(30) Foreign Application Priority Data

Jun. 23, 1998 (DE) .......................... 198 27 795

(51) Int. Cl.⁷ ................................ G01S 3/16
(52) U.S. Cl. ...................................... 342/379
(58) Field of Search ......................... 342/379

(56) References Cited

U.S. PATENT DOCUMENTS 3,987,444 A * 10/1976 Masak et al. ............... 342/380

FOREIGN PATENT DOCUMENTS

EP        0 098 339 A1 *  6/1982 ............ H01Q/3/26

* cited by examiner

Primary Examiner—Thomas H. Tarcza
Assistant Examiner—Fred H. Mull
(74) Attorney, Agent, or Firm—Oblon, Spivak, McClelland, Maier & Neustadt, P.C.

(57) ABSTRACT

A multibeam antenna having a plurality of radiators arranged in a form of a dipole field and configured to generate a plurality of lobes, a main antenna including a first set of the plurality of radiators, and an acillary antenna including a second set of the plurality of radiators and configured to suppress disturbances received by the main antenna, wherein each radiator of the second set of radiators makes no significant contribution to lobe generation in the main antenna and whose omission has no effect on the output and directionality of the main antenna.

9 Claims, 3 Drawing Sheets

INTEGRATED ADAPTIVE ANTENNA OF A MULTIBEAM ANTENNA

BACKGROUND OF THE INVENTION

1. Field of the Invention

The invention relates to an antenna arrangement with a plurality of radiators arranged in the form of a dipole field.

2. Discussion of the Background

An antenna, as is known from EP-A-0 098 339, is configured as a phased-array radar antenna by way of which a main lobe is generated in a chronological sequence, and in which context the generated main lobes have differing directions, in order to irradiate a section of sky. In this arrangement, where a dipole field generated by a large number of mainly horizontal dipole lines arranged one under the other, not all dipoles are connected for configuration of an overall antenna, but rather some adjacent dipoles are combined to form ancillary antennas arranged within the aperture of the main antenna, by which interferences are suppressed, which are mainly received from the main antenna because of subsidiary lobes which cannot be avoided.

SUMMARY OF THE INVENTION

The invention is based on the objective of creating an antenna arrangement including a plurality of radiators which are arranged in the form of a dipole field, for generation of a plurality of lobes in a main antenna, in which context some of the main radiators of the dipole field constitute an ancillary antenna for suppression of disturbances received by the main antenna, which can be employed as a multibeam antenna (multi-lobe antenna) in which context the capacity of a multibeam antenna includes its ability to generate simultaneously in a very precise manner, a large number of main lobes (hereafter simplified to "lobes").

This objective is achieved by a multibeam antenna (multi lobe antenna) configured to simultaneously generate a plurality of main lobes, wherein radiator components in the resultant dipole field, which make no significant contribution to the generation of the lobes, are included in the ancillary antenna and are fed accordingly.

An advantage of the invention resides in the fact that the ancillary antenna does not increase the size of the overall antenna arrangement.

A further advantage of the invention resides in the fact that because neither the topmost nor the bottom lines of the main antenna are used for the ancillary antenna radiators (which is also not the case in prior art), the aperture of the main antenna is largely unchanged. By suitable calculation of the power distribution to individual radiators, for example dipoles, the antenna can be selected from a wide variety of possible power distributions, in which context, for example, two lines of radiators which have spacing from the upper/lower edge of the antenna arrangement for the main antenna, are only fed with such low levels of current (or, on receive mode, for combination to produce a total signal, only such low levels of current are contributed), that the omission of these radiators will exert no practical affect on the output and directionality of the antenna. These radiators which thus provide no noticeable contribution to generation of the lobes for the main antenna and are not needed for the main antenna, are used as ancillary antennas on receive mode. The invention does not exclude co-utilization of radiators of the ancillary antenna in transmit mode for transmission, but such that they support the configuration of the lobes of the main antenna.

It may also be advantageous to implement calculation of the power distribution of individual radiators of the main antenna such that only an individual line produces no significant contribution towards the configuration of lobes, and thus only one individual line of radiators will be used as the ancillary antenna in receive mode.

It is not necessary for a complete line (or several complete lines) of radiators to configure the ancillary antenna, nor is it necessary if design considerations, particularly considerations of supply to the individual radiators should possibly make it advantageous for at least several radiators from a single line to be employed for the main antenna.

In accordance with the invention, then, it is possible to set up an antenna system in which, if—for example from an elevation angle of 3° above the plane of the horizon and below it (from this area, only disturbance signals are anticipated)—the reception of signals which have been received from the main antenna should be suppressed by the ancillary antenna for each individual one of the lobes operated simultaneously in the radiation curve of the main antenna, then at least one lobe of the ancillary antenna, whose elevation is for example approximately 3°, can simultaneously be generated.

In respect of the main lobes, it should also be mentioned that these are in general arranged according to several lines and columns (usually not in a precise rectilinear arangement in relation to each other), in which context the center of the main lobe of each individual lobe is at the crossover of the lines and columns.

In the case of form of embodiments in accordance with the invention, it is envisaged, for supply to the main antenna and to the ancillary antenna, that there should be a joint feed network which should ideally be constructed of Butler matrixes and Blass matrixes. The system is made up such that the transmit/receive arrangement of the antenna system is connected to input from the Blass matrixes, whose outputs are connected to inputs for the Butler matrixes whose outputs are in turn each connected to an individual radiator. Under this arrangement with a common feed matrix, there is also the option in certain operating cases, for examples in transmit mode, of using radiators of the ancillary antenna (or additional antenna) for purposes of transmission if desired.

In the example shown, the Blass matrixes bring about "pivot" (this is the change in direction in relation to the direction running perpendicular to the plane of the antenna aperture) in elevation, whilst the Butler matrixes bring about pivot in azimuth.

Under the other form of embodiment of the invention, on the other hand, it is envisaged that the main antenna and the additional antenna, although this is topographically arranged within the main antenna, should be fed from entirely separate feed networks.

BRIEF DESCRIPTION OF THE DRAWINGS

As an alternative for using one line (in the horizontal plane) of radiators in the antenna system for purposes of the ancillary antenna, it would alternatively be possible, depending on the applications, to envisage one column.

Further characteristics and advantages of the invention can be seen from the description of examples of embodiment for the invention on the basis of the drawing which illustrates the main details of the invention, and from the claims. Individual characteristics can be embodied individually and on their own or in groups of several units in any combination for a given form of embodiment of the invention.

There are illustrated in:

Figure 1:
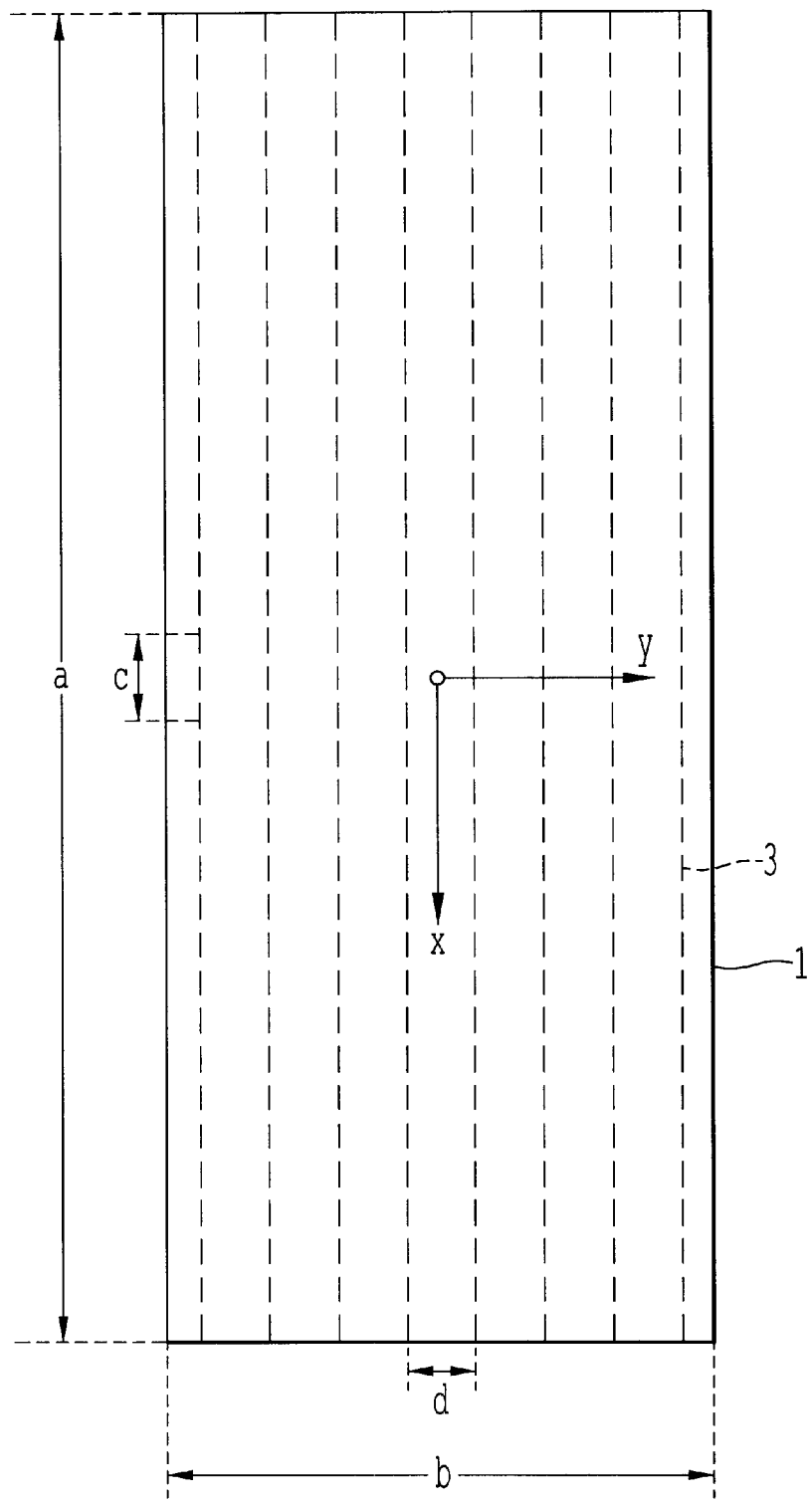
Figure 2:
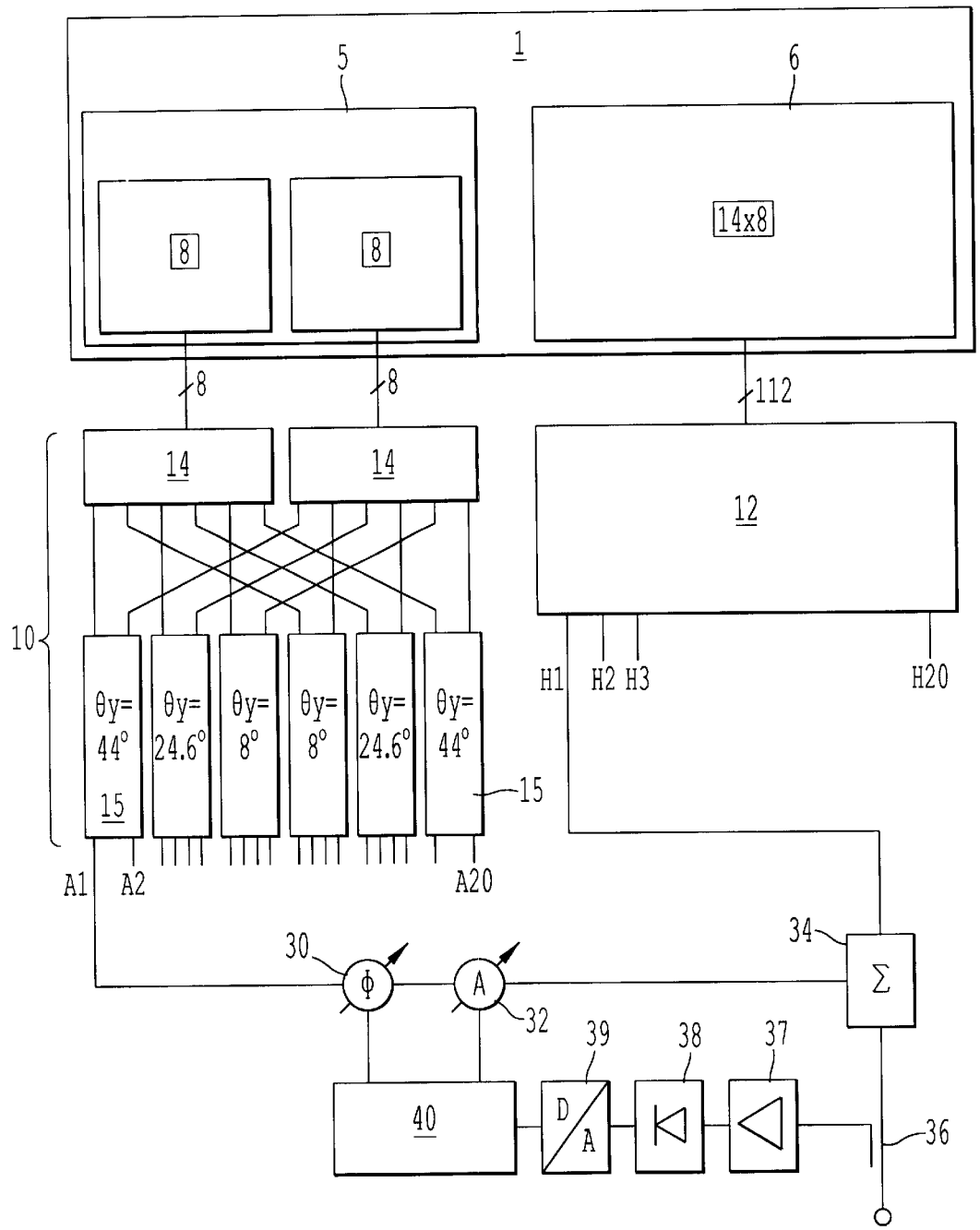

FIG. 1: a plan view of the dipole field in a multibeam antenna with 16×8 dipoles, FIG. 2: Overview of an antenna system using the dippole filed as per FIG. 1 in accordance with an initial example of embodiment with separate feed to the additional antenna, FIG. 3: An arrangement corresponding to FIG. 2 with a standardised feed arrangement for the main antenna and ancillary antenna or additional antenna, and, FIG. 4: The structure of feed network 50 from FIG. 3 in respect of Blass matrixes and Butler matrixes.

DESCRIPTION OF THE EMBODIMENTS

In the example, the dipole field consists of a planar arrangement of 16 lines and 8 columns of dipoles, thus 16×8 dipoles. The dipoles are vertical-polarised and aligned parallel to the plane of antenna aperture 1. In operation, the arrangement as per FIG. 1 is not vertical but is inclined at an angle of 45° in relation to the vertical plane, such that the longitudinal axis of individual dipoles 3 does not run vertically but inclines at the above-mentioned angle of 45° in relation to the vertical.

The dipoles have an integral of 0.45 lambda rectangular to the dipole axis ("azimuth") and of 0.55 lambda in the dipole axis ("elevation").

In the form of embodiment as per FIG. 2, it is assumed that the power distribution for individual dipoles 3 is designed such that, starting from below, the $3^{rd}$ and $14^{th}$ line of a given set of 8 dipoles for configuration of the main antenna lobes do not make any significant contribution in receive mode and in the ideal instance only a negligible contribution. These $3^{rd}$ and $14^{th}$ lines of the dipoles are employed as ancillary antennae. This fact is not evident from FIG. 2, but here, the ancillary antenna is represented purely as arrangement 5 of 2×8 dipoles whilst the main antenna represents an arrangement 6 of 14×8 dipoles.

Antenna aperture 1 or dipole field 1 of FIG. 2 receives, i.e. is fed, via two separate feed networks 10 of 12, where feed network 10 feeds the ancillary antenna and feed network 12 feeds the main antenna. Here, as is the general practice, the expression "feed network" is employed, although in a receive mode, naturally, there is no feed to the antennae but a convergence (vectorial addition) of signals supplied by the antennae.

Feed network 10 exhibits two Butler matrixes 14, each of which feeds one of the above-mentioned lines of 8 dipoles of the 2 dipole line employed for the ancillary antenna, and 6 vertical feed networks 15 which feed the Butler matrixes. The connection of the vertical feed network 15 shown at the bottom in FIG. 2, to which the signals originating from the additional antenna arrive in receive mode, are designated by reference marks A1 to A20. In the drawing, the further connection of connection A1 is indicated. Each vertical feed network 15 is configured by a phase shifter and a divider 1:2 or 1:4 which connects the phase shifter to the 2 or 4 connections of the respective vertical feed network to the one in the lower section of FIG. 2.

Feed network 12 for the main antenna with 14×8 dipoles includes 14 Butler matrixes (one Butler matrix for each of the 14 dipole lines of the main antenna) and 6 Blass matrixes. These are not illustrated individually but are included in the installation (feed network) designated by reference mark 12. Feed network 12 exhibits 20 connections H1 to H20. Here too, the further circuitry is illustrated exclusively for output H1. From the feed network 12, the 112 feed lines lead to 112(=14×8) dipoles of the main antenna.

In respect of feed network 10, the 20 connections A1 to A20 provide the reception signals for the 20 ancillary lobes of the ancillary antenna. Each ancillary lobe is allocated specifically to one of the 20 main lobes of the main antenna, whose reception signals are available at connections H1 to H20.

Connection A1 of feed network 10 leads to a connection of a digitally adjustable phase shifter 30, whose output is connected to the input of an attenuator 32 which has digital adjustment in respect of its gain or damping, whose output leads to an input of a summing circuit 34, which exhibits a further input which is connected to connection H1 of feed network 12. The output from summing circuit 34 leads to further installation in the radar system which analyses the received signal. A proportion of the signal originating from the outputs of summing circuit 34 is fed via a coupling installation 36, in the example a relay coupler, an amplifier 37 and subsequently a demodulator 38, and finally via an analogue/digital converter 39, to a digital adaptive processor 40. This exhibits a digital processor which actuates phase shifter 30 and attenuator 32 via control lines such that the signal fed to processor 40 from digital/analogue converter 39 is minimised. Once that has been achieved, then optimum suppression of the interference signal from the first lobe is achieved.

For each individual one of the other connections A2 to A20 of feed network 10 and H2 to H20 of feed network 12, the above-described circuit, including the phase shifter, the attenuator, the summing circuit, and the installations subordinate to the same are also envisaged such that for all 20 lobes simultaneously, and thus very rapidly, adaptive regulation can be performed by way of the processor 40 allocated in each case. If it is feasible in the context of the speed of calculation of processor 40 and the required operating speed of the radar antenna, then it is also possible to envisage purely a single processor 40 which consecutively processes all 20 output signals of feed network 10 and of feed network 12.

Figure 3:
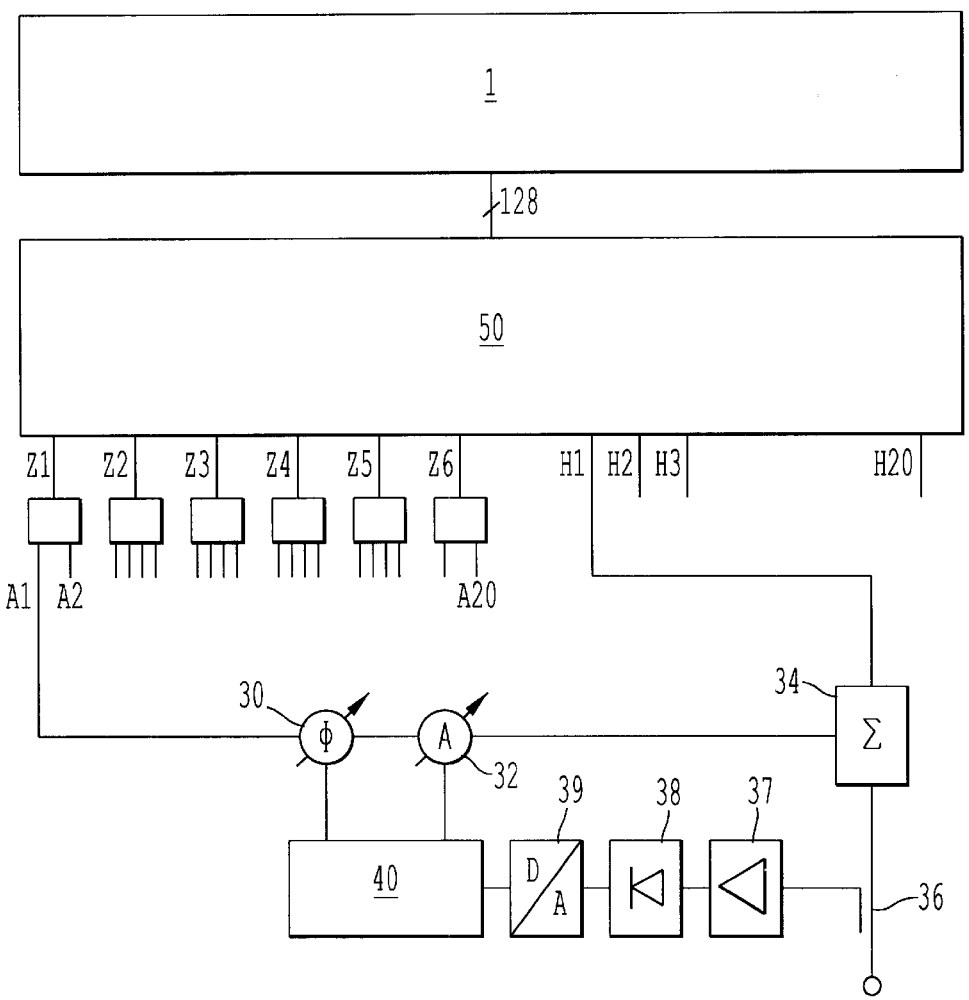

The example of embodiment as per FIG. 3 does not differ in respect of its dipole field and in the arrangement of the $3^{rd}$ and $14^{th}$ line of the dipole to the ancillary antenna and of the other dipole to the main antenna in relation to the dipole field of FIG. 2. However, here, there are not different feed networks for the ancillary antenna on the one hand and the main antenna on the other, but a standardised feed network 50 consisting of 16 Butler matrixes 52 and 6 Blass matrixes 54, see FIG. 4. Feed network 50 as illustrated exhibits 20 outputs H1 to H20 for the main lobes of the main antenna and 20 outputs A1 to A20 for the ancillary lobes of the ancillary antenna. Outputs H1 to H20 of the main antenna are, as in FIG. 2, envisaged in the right-hand section of the Figure, whilst outputs A1 to A20 of the ancillary antenna are provided with installations designated Z1 to Z6, relating to l:n splitters (namely 1:2-splitter and 1:4-splitter). The remaining circuitry concerning items 30, 32, 34, 36, 37, 38, 39 and 40 is consistent with FIG. 2.

In the examples shown, the multibeam antenna together with its main antenna section in the cases of FIGS. 2 and 3 simultaneously generates four lines with six columns of main lobes, in which context, however, some columns are not equipped with four main lobes, but that overall there are only 20 main lobes. The ancillary antenna, in a range of 3° above the plane of the horizon, generates 20 main lobes, each of which is allocated to a main lobe of the main antenna.

Figure 4:
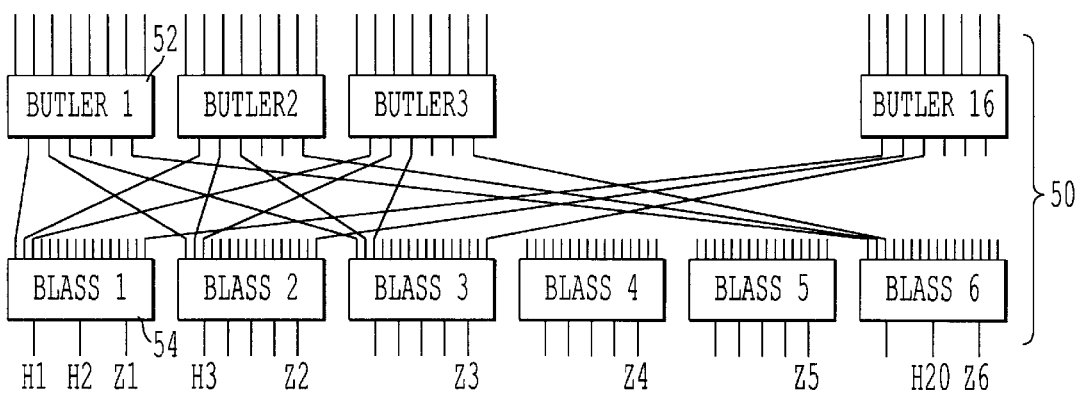

As illustrated in FIG. 4, connections Z1 to Z6 represent an additional output of the total of 6 Blass matrixes 54.

Furthermore, these exhibit the 20 connections H1 to H20 which are used for feed to the main antenna, specifically for generation of one of lobes 1 to 20. The upper connections in FIG. 4 for the Butler matrixes 52 are each connected to one of the radiators (dipole) of antenna 1. Each upper connection in FIG. 4 for the first Blass matrix (Blass 1) is connected to the first lower connection of the individual Butler matrixes. The further connection can be seen in FIG. 4, in which context not all individual connections are illustrated.

In the selection of radiators for the ancillary antenna, it should betaken into account that the phased centers of the main antenna and of the ancillary antenna are identical or are at least very close to each other. This is advantageous because this situation also means that if a disturbance source to be suppressed is exhibiting rapid movement, for example as in an aircraft, the relative phase between the reception signals for the main antenna and those for the ancillary antenna varies only slightly. In the above-described examples of embodiment, the required identically of phased centers is present because of the symmetrical arrangement of the ancillary antenna dipoles in relation to the overall dipole field.

In FIG. 1, the following dimensions are envisaged in the example given: length a of antenna aperture=5.90 m, width b=2.38 m, dipole interval center—center in plane a=0.366 m, d=0.3 m.

What is claimed is:

1. A multibeam antenna comprising:
    a plurality of radiators arranged in a form of a dipole field and configured to generate a plurality of lobes;
    a main antenna including a first set of said plurality of radiators; and
    an ancillary antenna including a second set of said plurality of radiators and configured to suppress disturbances received by the main antenna,
    wherein each radiator of said second set makes no significant contribution to lobe generation in the main antenna and whose omission has no effect on an output and directionality of the main antenna.

2. The multibeam antenna according to claim 1, wherein the main antenna is configured such that specific radiator elements, not topmost nor bottom line radiator elements, have a power allocation which make no significant contribution to lobe generation in the main antenna.

3. The multibeam antenna according to claim 1 or 2, further comprising:
    two separate feed networks, one feed network configured to feed said first set of said plurality of radiators of the main antenna, and another feed network configured to feed said second set of said plurality of radiators of the ancillary antenna.

4. The multibeam antenna according to claim 3, wherein at least one of the two feed networks includes at least one of a Butler matrix and Blass matrix.

5. The multibeam antenna according to claim 3, wherein outputs of the main antenna and the ancillary antenna are combined for adaptive compensation of interference signals.

6. The multibeam antenna according to claim 1 or 2, further comprising:
    a feed network configured to feed said first set of said plurality of radiators of the main antenna and to feed said second set of said plurality of radiators of the ancillary antenna.

7. The multibeam antenna according to claim 6, wherein the feed network includes at least one of a Butler matrix and Blass matrix.

8. The multibeam antenna according to claim 6, wherein outputs of the main antenna and the ancillary antenna are combined for adaptive compensation of interference signals.

9. The multibeam antenna according to claim 1 or 2, wherein phase centers of the main antenna and the ancillary antenna are closely adjacent to each other.

* * * * *

UNITED STATES PATENT AND TRADEMARK OFFICE
CERTIFICATE OF CORRECTION

PATENT NO.      : 6,424,296 B1
DATED           : July 23, 2002
INVENTOR(S)     : Zeitz et al.

It is certified that error appears in the above-identified patent and that said Letters Patent is hereby corrected as shown below:

<u>Title page,</u>
Item [73], the Assignee information is incorrect. Item [73] should read:

-- [73]  Assignee:  SEL Verteidigungssysteme GmbH,
                    Stuttgart (DE) --

Signed and Sealed this

Thirty-first Day of December, 2002

JAMES E. ROGAN
*Director of the United States Patent and Trademark Office*